INVENTORS
RUSSELL E. FREDRICK
JAMES D. RICHARDS

BY Carpenter, Abbott, Coulter & Kinney
ATTORNEYS

INVENTORS
RUSSELL E. FREDRICK
JAMES D. RICHARDS

BY Carpenter, Abbott, Coulter & Kinney
ATTORNEYS

INVENTORS
RUSSELL E. FREDRICK
JAMES D. RICHARDS

BY Carpenter, Abbott, Coulter & Kinney
ATTORNEYS

INVENTORS
RUSSELL E. FREDRICK
JAMES D. RICHARDS
BY
Carpenter, Abbott, Coulter & Kinney
ATTORNEYS United States Patent Office 3,403,133

Patented Sept. 24, 1968

3,403,133
THERMOELECTRIC COMPOSITIONS OF TELLURIUM, MANGANESE, AND LEAD AND/OR TIN

Russell E. Fredrick, White Bear Lake, and James D. Richards, Roseville, Minn., assignors to Minnesota Mining and Manufacturing Company, St. Paul, Minn., a corporation of Delaware Continuation-in-part of application Ser. No. 162,083, Dec. 26, 1961. This application July 5, 1966, Ser. No. 563,933
9 Claims. (Cl. 252—62.3)

ABSTRACT OF THE DISCLOSURE

P-type thermoelectric compositions of lead and/or tin, manganese and tellurium, part of the tellurium being replaceable by selenium and/or sulfur. The manganese, in amounts from 0.7 to 7 atomic percent of the total composition, has a highly beneficial effect on thermoelectric properties, especially as compared to metal-excess, P-type lead-tin telluride compositions of the prior art.

This application is a continuation-in-part of our copending application Ser. No. 162,083 filed Dec. 26, 1961, now abandoned.

This invention relates to improved thermoelectric compositions and to thermoelectric devices utilizing such improved compositions.

Efficient thermoelectric conversion between thermal and electrical energy requires electrically conductive materials which possess high figures of merit Z, defined as:

$$Z=\frac{S^2}{K\rho}$$

where S is the Seebeck coefficient, $\rho$ is the electrical resistivity, and K is the thermal conductivity of the material. Other desirable properties of thermoelectric materials are:

(1) Adequate mechanical strength together with high thermal and mechanical shock resistance.

(2) Ease of contacting with chemically and metallurgically stable low-resistance electrical contacts.

(3) Low vapor pressure at maximum intended operating temperatures.

(4) Stability of electrical, chemical and metallurgical properties while in a temperature gradient, while in the presence of other thermoelectric, structural and insulating materials, and while exposed to the circumambient atmosphere.

The foregoing thermoelectric and physical attributes are attained in the present invention by thermoelectric compositions taking the form of preferably homogeneous solid solutions of the tellurides of manganese and at least one of lead and tin. The invention includes for the control of carrier concentration, certain non-stoichiometric compositions containing an excess of the metal cation and hereinafter referred to as metal-excess compositions or alloys as well as certain compositions containing an excess of the anion and hereinafter referred to as tellurium-excess compositions or alloys. The invention further includes compositions to which small amounts of beneficial impurity have been added to stoichiometric as well as non-stoichiometric compositions of the present invention.

Of the thermoelectric materials developed prior to the present invention, lead telluride compositions appear to exhibit the most attractive figure of merit within the temperature range of 300° to 900° K. Lead-excess N-type lead telluride can be readily contacted and has found relatively wide application. P-type tellurium-excess lead telluride presents problems, however, because of the fact that it cracks easily whenever thermally or mechanically shocked, and further because no means is yet known in the art for providing a low electrical resistance metallurgical contact therewith, which contact is stable at elevated temperatures.

The present invention includes certain compositions which are unusual in that they are P-type and not necessarily tellurium-excess. The metal-excess compositions of the present invention exhibit substantially improved mechanical properties and, more importantly, readily permit bonding thereto of a passive metallic conductor by means of a bond which remains metallurgically stable at elevated temperatures. The tellurium-excess compositions may have somewhat better thermoelectric properties than do the metal-excess, but are weaker mechanically, are more susceptible to degradation, and require considerable care in making electrical contacts.

The instant invention includes P-type thermoelectric compositions of tellurium, manganese and at least one of lead and tin wherein the manganese comprises from about 0.7 to 7 atomic percent and the tellurium comprises from about 47.5 to 56.3 atomic percent of the total lead, tin, manganese and tellurium. The invention also includes such compositions wherein selenium and/or sulfur has been substituted for tellurium in an amount not to exceed 50 atomic percent of the tellurium concentration and not to exceed 20 atomic percent of the tellurium concentration in the case of sulfur. The invention further contemplates the addition to the aforedescribed compositions of minor amounts of promoter for increasing the extrinsic carrier concentration.

While useful thermoelectric properties are possessed by all compositions of the present invention, whether tellurium-excess, metal-excess or exactly stoichiometric, the most consistently reproducible properties are those possessed by compositions of the present invention having an anionic or cationic excess which is sufficiently different from zero to assure the presence of a small but finite plural phase constituent in addition to a dominant single phase constituent. When such a plural phase constituent is present, the carrier concentration is nearly independent of the magnitude of the deviation from exact stoichiometry which for the cationic excess composition may extend to a minimum of 47.5 atomic percent tellurium and the anionic excess composition may extend to a maximum of 56.3 atomic percent tellurium, 50 atomic percent tellurium representing exact stoichiometry.

The compositions of the present invention mainly comprise tin and lead telluride and include minor amounts of manganese telluride which electrical measurements indicate is soluble up to about 10 weight percent of the tin telluride-lead telluride constituent. An exemplary preferred metal-excess composition of the present invention comprising 2.7 weight percent manganese telluride contains:

| | Atomic Percent |
|---|---|
| Tellurium | 49.9 |
| Tin | 27.7 |
| Lead | 20.3 |
| Manganese | 2.1 |

plus an additional 1.0 atomic percent of sodium promoter.

In general, optimum thermoelectric and physical properties may be obtained over a wide range of metal-excess compositions having atomic ratios of tin to lead extending from approximately 4:5 to 5:1. At the higher ratios of tin to lead, the proportion of manganese is preferably increased to about 3–5 atomic percent or more, with little need for any positive promoter. On the other hand, where the atomic ratio of tin to lead is near 1:1, about 2 atomic percent manganese is preferred together with about 1–2 atomic percent of sodium, potassium and/or thallium promoter based on total tin, lead, manganese and tellurium. These metal-excess compositions preferably comprise at least 49.5 atomic percent tellurium.

As for the tellurium-excess compositions of the present invention, optimum thermoelectric properties are obtained at atomic ratios of lead to tin from more than about 2:1 to all lead and at manganese contents of about 1–2 atomic percent. Within this optimum range, there is little need for a positive promoter at atomic ratios of lead to tin near 2:1, but the beneficial effect of a promoter increases to a preference for as much as 3 atomic percent of sodium, potassium and/or thallium in the absence of tin. Preferably the proportion of tellurium does not exceed 50.5 atomic percent based on total lead, tin, manganese and tellurium.

The preparation of the compositions may be effected by reacting the weighed elemental constituents in a graphite crucible under a hydrogen atmosphere at a temperature sufficient to effect complete melting. If desired, however, the individual tellurides may be prepared separately and then cross-blended in a subsequent melting step.

The alloy produced in the final melting step may be cast into ingots under a reducing atmosphere, for example in a graphite mold, in the desired shape for thermoelectric legs. Alternatively, the alloy in the final melt may be cast into a suitable ingot form and subsequently crushed to a coarse random powder, for example one which can pass through a 50 mesh screen. This powder may then be pressed, for example under 40,000 pounds per square inch pressure, to form thermoelectric legs of suitable size and shape. The cast or powder-pressed legs are then preferably heat treated under a hydrogen atmosphere to bring the same to equilibrium conditions. One method of producing useful thermoelectric properties involves a heat treatment for a period of 2 hours at 760° C. followed by 8 to 10 hours at 427° C. If the 760° C. heating step is omitted, a substantial extension of the 427° C. heating step may be required to obtain equilibrium conditions.

Some of the major variables which influence electrical properties of the compositions of the present invention are:

(1) The relative concentrations of the tellurides of tin and lead.

(2) The magnitude of the anion or cation excess.

(3) The temperature at which the composition is brought to equilibrium.

(4) The concentration of beneficial impurities or promoters of the type that control the concentration of charge carriers.

(5) The concentration of manganese telluride which further permits alteration of the charge carrier transport characteristics of the lattice.

Reference is now made to the drawing from which the invention may be better understood, even though most of the figures concern compositions which are not part of the present invention, although related thereto. In the drawing.

As a matter of convenience, many of the thermoelectric compositions discussed hereinbelow such as those forming the basis for FIGURES 1 and 2 were prepared in terms of weight relationships and their thermoelectric properties were charted on the same basis. Atomic relationships for the compositions employed in making FIGURES 1 and 2 are given in the following table:

| Wt. ratio SnTe/PbTe | Atomic ratio of Sn to Pb | Atomic percent Sn | Atomic percent Pb | Atomic percent Te |
|---|---|---|---|---|
| 50/50 | 1.36 | 28.881 | 21.255 | 49.864 |
| 60/40 | 2.04 | 33.630 | 16.500 | 49.870 |
| 70/30 | 3.17 | 38.106 | 12.018 | 49.876 |
| 80/20 | 5.44 | 42.331 | 7.788 | 49.881 |
| 90/10 | 12.23 | 46.326 | 3.788 | 49.886 |
| 100/0 | ∞ | 50.109 | 0 | 49.891 |

Figure 1:
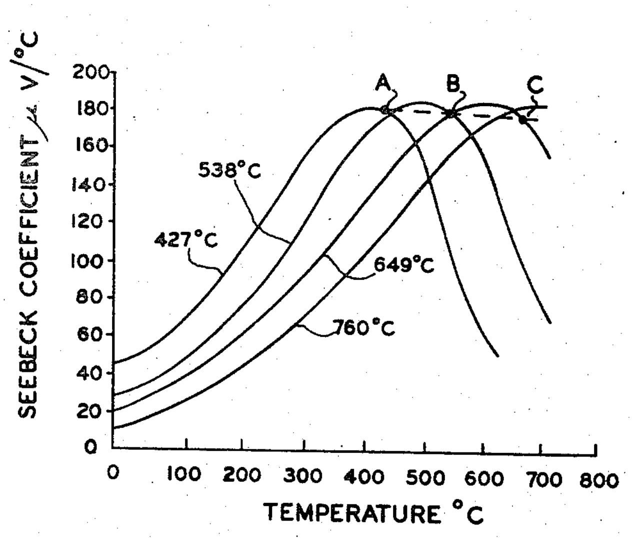
FIGURE 1 is a graphic illustration of the effect on the Seebeck coefficient versus temperature characteristics of a number of samples of a metal-excess 70/30 by weight tin telluride-lead telluride composition, said samples having been quenched from various indicated elevated temperatures.
Figure 2:
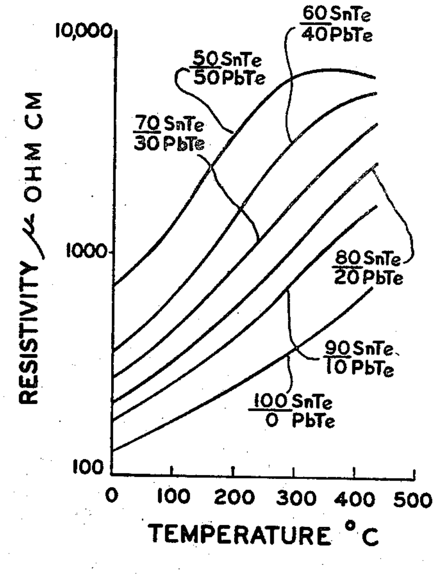
FIGURE 2 is a graphic illustration of the resistivity versus temperature characteristics of a number of metal-excess tin telluride-lead telluride compositions.

Even though these compositions are not exemplary of the present invention in that they contain no manganese, their behavior as illustrated in FIGURES 1 and 2 is pertinent to compositions of the present invention. Such pertinence will be apparent from FIGURES 6 and 7 which concern compositions of the present invention containing manganese.

FIGURE 1 demonstrates the effect of heat treatment on four identical samples of the metal-excess 70/30 SnTe–PbTe compositions identified in the above table. These samples as a group were given an equilibrium anneal at 760° C., and one of the samples was quenched from this temperature in order to preserve at room temperature the electrical properties characteristic of 760° C. The annealing temperature was then lowered successively in steps to 649° C., 538° C., 427° C. and 316° C., and from each of these temperatures another one of the samples was quenched after allowing sufficient time at the respective temperature for the composition to come to equilibrium. An extended anneal at 315° C. produced no significant change in the electrical properties from those observed at 427° C.

In FIGURE 1, point A on the curve represents the equilibrium property of a sample quenched from 427° C. Similarly points B and C represent equilibrium properties at 538° C. and 649° C., respectively, on the curves representing the samples quenched from 538° C. and 649° C., respectively. The dashed line connecting points A, B and C therefore represents the equilibrium Seebeck coefficient over the temperature range 427° C. to 649° C. Below 427° C. the equilibrium Seebeck coefficient is represented by the curve for the sample quenched from 427° C.

FIGURE 2 illustrates the electrical resistivity versus temperature characteristics from 0° to 427° C. of samples in which the SnTe/PbTe weight ratios are respectively 50/50, 60/40, 70/30, 80/20, 90/10 and 100/0. Each sample was given an equilibrium annealing treatment at 427° C. It will be observed that increasing concentration of tin telluride has the effect of lowering the resistivity of such equilibrium annealed samples.

Figure 3:
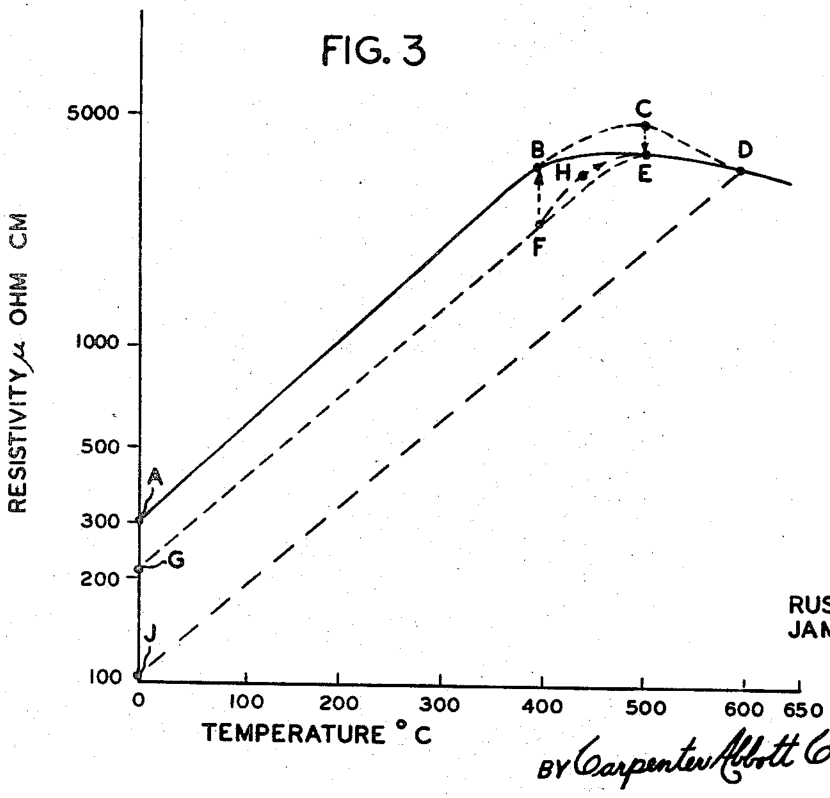
FIGURE 3 is a graphic illustration of the resistivity versus temperature characteristics of a sample of metal-excess tin telluride-lead telluride-manganese telluride composition of the present invention, demonstrating the effect on the resistivity of heating and cooling of the sample at both slow and rapid rates.

FIGURE 3 illustrates the effect of varying rates of heating and cooling on the resistivity of a sample of a typical metal-excess composition of the present invention. The particular sample represented by the curves in FIGURE 3 is a composition containing 98 weight percent of an 80/20 tin telluride-lead telluride constituent and 2 weight percent manganese telluride (1.4 atomic percent manganese). In FIGURE 3 the solid line curve ABED represents the equilibrium resistivity versus temperature characteristic of the sample. Below 400° C. the temperature dependence of the resistivity is dominated by the scattering of the lattice which increases with increasing temperature. However, above about 400° C. the equilibrium resistivity tends to level off and then drop slightly as shown by the curve portion BED, due to an increase in carrier concentration which tends to compensate for the increase in lattice scattering with increased temperature.

If, after an equilibrium anneal, the sample of FIGURE 3 is rapidly heated, for example at a rate of about 75° C. per minute, the resistivity follows the equilibrium curve from A to B. Above 400° C. with continued rapid heating, the resistivity tends to rise along the dotted curve from B toward C in accordance with the normal temperature dependent lattice scattering observed below 400° C. If the temperature of the sample is held constant at 500° C., the resistivity tends to fall back toward the equilibrium value along dotted line from C toward E. If instead of holding the temperature of the sample constant at 500° C., rapid heating is carried out without interruption from about 400° C. to 600° C., the resistivity rises along the dotted curve BC and then falls off gradually to the equilibrium value at D as the temperature reaches 600° C.

Upon rapid cooling of the sample of FIGURE 3, for example at the rate of about 150° C. per minute, the reverse trend is noted. Between 600° C. and 500° C. the resistivity follows the equilibrium curve from D to E. As the rapid cooling is continued below about 500° C., the resistivity falls along the dotted curve portion EFG. On the other hand, if the sample is cooled rapidly from 600° C. to 400° C. and the temperature thereof is then held constant at 400° C., the resistivity rises from point F to equilibrium at point B.

If, after having been rapidly cooled from 600° C. to, for example 0° C., the sample is then heated to 600° C. at the aforementioned rapid rate, the resistivity follows the dotted curve portions GFHE, and upon reaching the equilibrium value at E, follows the equilibrium curve from E to D. If the sample of FIGURE 3 is quenched from 600° C., the resistivity versus temperature characteristic thereof is represented generally by the line DJ.

Figure 4:
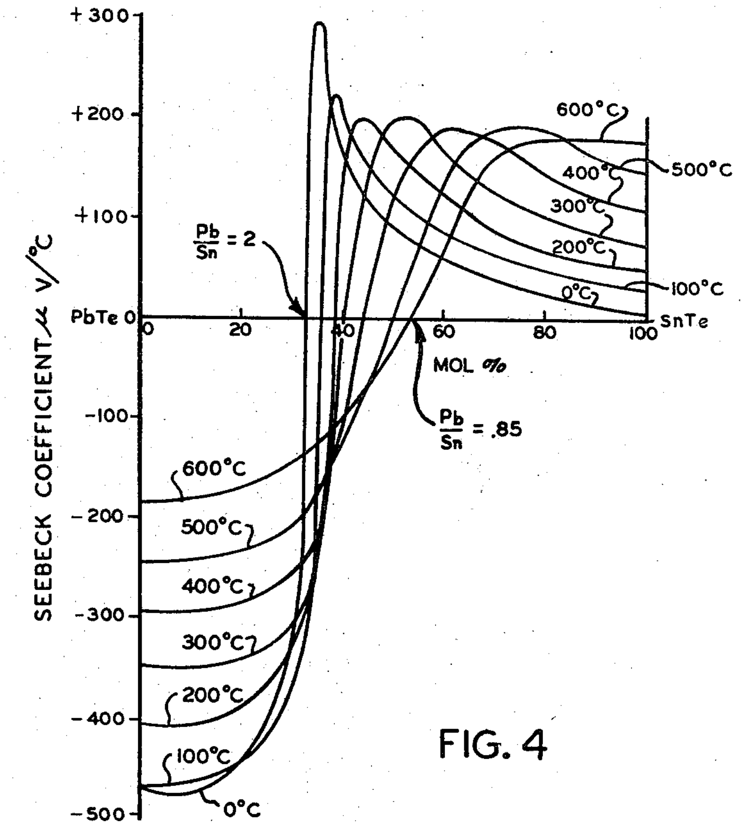
FIGURE 4 is a graphic illustration, in the form of a series of isotherms, of the Seebeck coefficient of a representative set of metal-excess tin telluride-lead telluride alloys.

Referring to FIGURE 4, it will be seen that metal-excess lead telluride-tin telluride compositions at all operating temperatures are N-type at atomic ratios of lead to tin above 2:1. The presence of manganese and positive promoters shifts these curves substantially to the left, but preferred P-type thermoelectric properties are obtained in compositions of the present invention when the atomic ratio of lead to tin ranges from zero to about 2:1.

Figure 5:
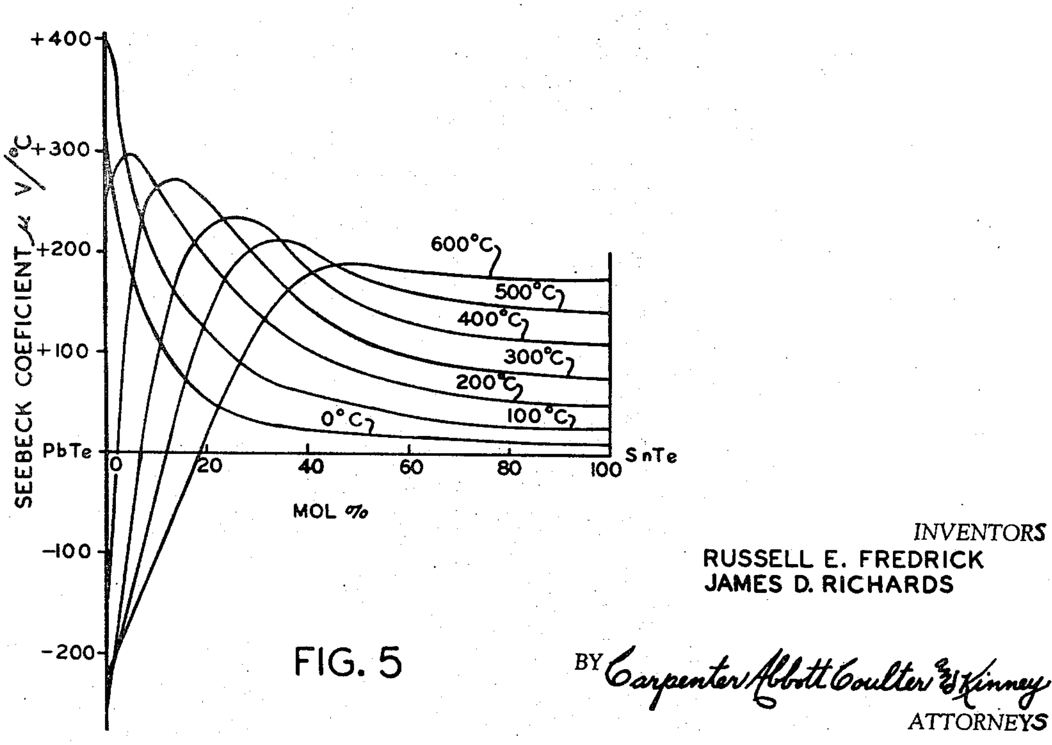
FIGURE 5 is a graphic illustration similar to FIGURE 4 of the Seebeck coefficient of a representative set of tellurium-excess tin telluride-lead telluride alloys.

FIGURE 5 demonstrates that Seebeck coefficients of P-type character are obtained for all tellurium-excess compositions of lead telluride-tin telluride. However, the thermoelectric properties of the tellurium-excess compositions of the present invention are less satisfactory above atomic ratios of tin to lead of about 3:1.

Figure 10:
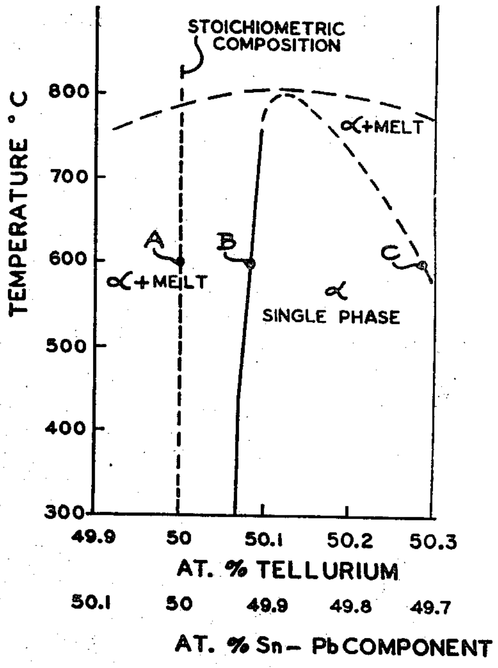
FIGURE 10 is a partial pseudo-binary phase diagram of a tin telluride-lead telluride system.

The unique electrical properties characteristic of the compositions of the present invention may be better understood by reference to FIGURE 10 which represents an approximate partial phase diagram typical of a metal-tellurium system wherein the metal component consists of 76 atomic percent tin and 24 atomic percent lead. The diagram of FIGURE 10 was deduced from electrical resistivity measurements and assumed hole mobility of 500 cm.$^2$/volt second. From FIGURE 10 it will be observed that the illustrated tin telluride-lead telluride system exhibits a region of single phase $\alpha$ which lies entirely to the tellurium-excess side of stoichiometry being represented by the dotted vertical line at the composition 50 atomic percent tellurium, 50 atomic percent metal. To the left or metal rich side of the region of the single phase constituent, there is exhibited a region of plural phase constituent comprising $\alpha$ phase together with a metal-excess second phase which is molten above the lead-tin eutectic temperature of 183° C. Similarly, to the right or tellurium rich side of the region of the single phase constituent there is exhibited a region of plural phase constituent comprising $\alpha$ phase plus a tellurium-excess second phase which is molten above the metal telluride-tellurium eutectic temperature of 405° C.

A metal-excess sample of the system illustrated in FIGURE 10, when annealed at 600° C., develops at equilibrium a single phase $\alpha$ constituent represented by the point B plus a minor plural phase constituent comprising $\alpha$ together with a metal-excess phase, the single phase $\alpha$ constituent exhibiting a metal vacancy density proportional to the distance between points A and B. Since the point B lies to the tellurium-excess side of stoichiometry, the vacancies are metal vacancies and the conductivity is P-type. If, however, the point B were found to lie on the metal-excess side of stoichiometry, the vacancies would be tellurium vacancies and the conductivity would be N-type.

A tellurium-excess sample of the system illustrated in FIGURE 10, when annealed at 600° C., develops at equilibrium a single phase $\alpha$ constituent represented by the point C plus a minor plural phase constituent comprising $\alpha$ together with a tellurium-excess phase, the single phase $\alpha$ constituent exhibiting a metal vacancy density at 600° C. proportional to the distance between points A and C.

The temperature dependence of the electrical properties of the compositions of the system illustrated in FIGURE 10 is apparent from the slope of the line representing the boundary of the region of the single phase $\alpha$ constituent. More particularly, it will be observed that for samples containing metal in excess of the $\alpha$ composition brought to equilibrium above about 425° C., the departure of the single phase boundary composition from stoichiometry, and therefore the carrier concentration, increases with increasing equilibrium temperatures. This is evidenced by the divergence of the boundary line passing through point B from the vertical stoichiometric line passing through point A at temperatures above about 425° C. The generally parallel relationship between said boundary line and the stoichiometric line below about 425° C. indicates that such samples exhibit little or no temperature dependence of metal vacancy density at temperatures below about 425° C.

A similar phase diagram can be constructed for all compositions of the present invention. As is known in the prior art, for lead telluride the maximum melting point composition lies sufficiently close to stoichiometry to provide a portion of the single phase $\alpha$ region on the metal-excess side of stoichiometry. This explains the normally observed N-type behavior of metal-excess lead telluride and P-type behavior of tellurium-excess lead telluride. With increasing tin telluride concentration, the maximum melting point composition shifts toward a larger stoichiometric excess of tellurium, i.e., to the right in the phase diagram. Under equilibrium conditions metal-excess samples of tin telluride-lead telluride exhibit a shift in properties from N-type to P-type as the tin telluride concentration is increased, the composition at which the cross-over occurs depending upon the temperature, as is apparent from FIGURE 4. At the cross-over point, the composition of the single phase α constituent in equilibrium with a metal-excess is substantially stoichiometric.

It will be apparent from the foregoing that in the compositions of the present invention so long as there is a finite plural phase constituent in addition to the predominant single phase α constituent, the magnitude of the metal- or tellurium-excess in the plural phase constituent can vary considerably since the electrical properties of the composition are determined by the composition of the single phase α constituent. Since the electrical properties of the single phase α constituent can be readily and accurately controlled by heat treatment, thereby controlling the chemical composition of the single phase α constitutent, precise control over the concentration of the elemental components in compositions of the improved system is unnecessary. This feature of the improved system greatly facilitates the mass production of thermoelectric legs having uniform and desirable electrical properties.

Certain of the metal-excess compositions of the present invention are also exceptional in the respect that the single phase α region lies entirely to the tellurium-excess side of stoichiometry. As a consequence, it is possible to prepare samples which are metal-excess in average composition, but which are of P-type conductivity by virtue of the fact that the single phase α constituent thereof contains metal vacancies. Such metal-excess compositions are compatible with and are readily contactable by known contacting materials, for example iron contact electrodes. Thermoelectric legs made of such metal-excess P-type material, when thus contacted, exhibit a high degree of metallurgical stability heretofore unknown in thermoelectrically efficient P-type tellurides which have conventionally been tellurium-excess in character.

Figure 8:
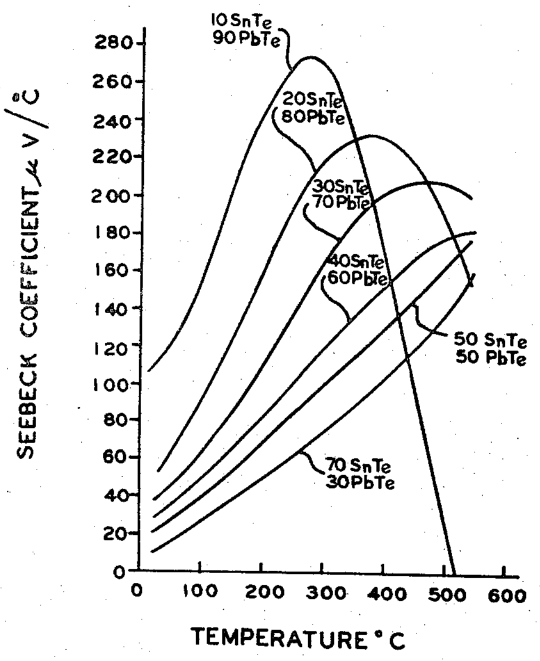
FIGURE 8 is a graphic illustration of the Seebeck coefficient versus temperature characteristics of a number of tellurium-excess compositions of tin telluride and lead telluride.
Figure 9:
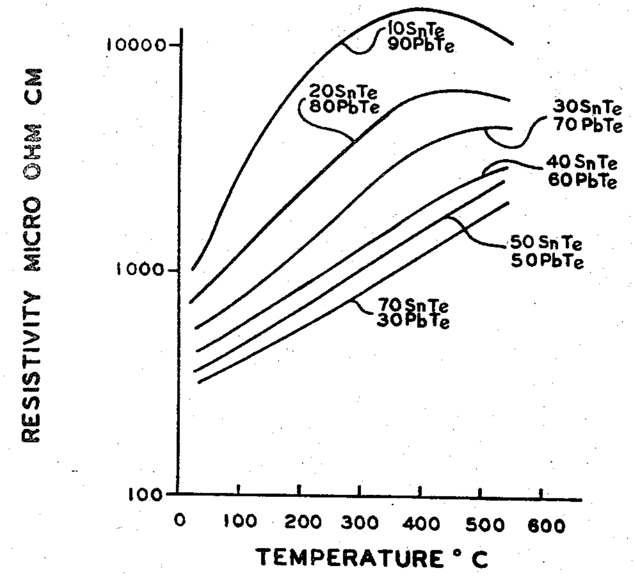
FIGURE 9 is a graphic illustration of the resistivity versus temperature characteristics of the tellurium-excess compositions of FIGURE 8.

FIGURES 8 and 9 illustrate respectively the Seebeck coefficient versus temperature and the resistivity versus temperature characteristics of a number of tellurium-excess tin telluride-lead telluride alloys. The samples represented by the curves were annealed 6 hours at 760° C. and furnace cooled 8 hours from 760° C. to 260° C. The compositions illustrated in FIGURES 8 and 9, expressed in terms of atomic percent of the elemental components thereof, are shown in the following table:

| Wt. ratio SnTe/PbTe | Atomic ratio of Sn to Pb | Atomic percent lead | Atomic percent tin | Atomic percent tellurium |
|---|---|---|---|---|
| 70/30 | 3.18 | 11.946 | 38.013 | 50.041 |
| 50/50 | 1.36 | 21.120 | 28.801 | 50.079 |
| 40/60 | 0.91 | 26.137 | 23.763 | 50.099 |
| 30/70 | 0.58 | 31.480 | 18.398 | 50.122 |
| 20/80 | 0.34 | 37.179 | 12.675 | 50.146 |
| 10/90 | 0.15 | 43.272 | 6.667 | 50.171 |

Figure 6:
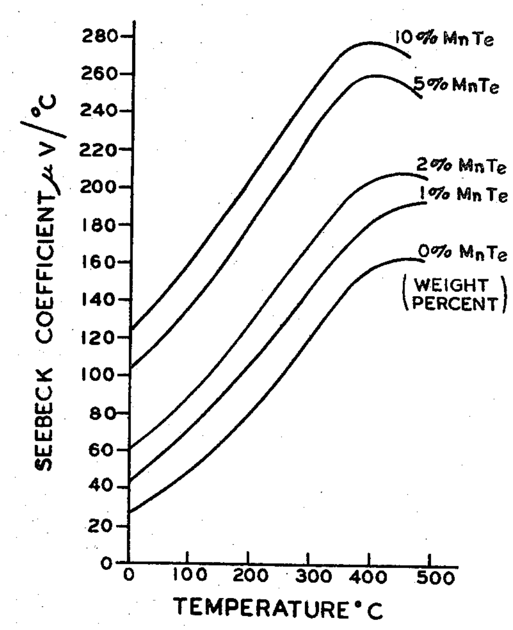
FIGURE 6 is a graphic illustration of the Seebeck coefficient versus temperature characteristics of a number of samples in which a metal-excess tin telluride-lead telluride composition is combined with various amounts of manganese telluride to provide compositions illustrative of the present invention.
Figure 7:
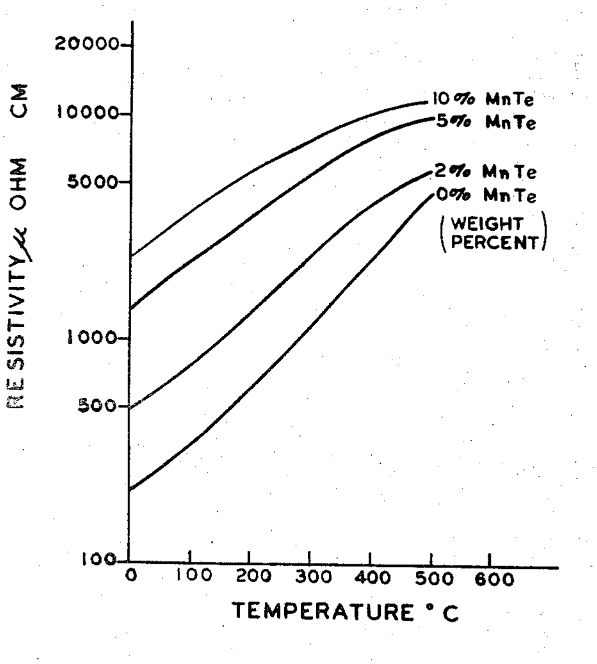
FIGURE 7 is a graphic illustration of the resistivity versus temperature characteristics of four of the samples of FIGURE 6.

The effect on the electrical properties of P-type tin telluride-lead telluride alloys produced by the addition thereto of manganese telluride is shown in FIGURES 6 and 7. When added in amounts up to 10 weight percent to, for example, an 80/20 by weight metal-excess tin telluride-lead telluride composition typical of the compositions of the present invention, manganese telluride has the effect of increasing both the equilibrium Seebeck coefficient and electrical resistivity. The atomic concentrations of the elemental components of the samples represented by the curves in FIGURES 6 and 7 are indicated in the following table:

| Weight percent MnTe | Atomic percent manganese | Atomic percent lead | Atomic percent tin | Atomic percent tellurium |
|---|---|---|---|---|
| 0 | 0 | 7.788 | 42.331 | 49.881 |
| 1 | .709 | 7.678 | 41.730 | 49.883 |
| 2 | 1.413 | 7.568 | 41.135 | 49.884 |
| 5 | 3.488 | 7.245 | 39.378 | 49.889 |
| 10 | 6.834 | 6.724 | 36.545 | 49.897 |

In addition to the desirable effect on the Seebeck coefficient provided by the presence of manganese telluride in the P-type pseudo-binary tin telluride-lead telluride compositions of the present invention, the electrical properties of such compositions can in certain instances be further enhanced by the addition of small amounts of doping or promoting agents which act to increase the extrinsic carrier concentration.

The effectiveness of promoting agents may depend upon the temperature, the relative proportions of tin telluride and manganese telluride of the base composition, whether the composition is metal-excess or tellurium-excess, and, when the promoter is present in excess of the limit of solubility in the single phase composition, also depends upon its temperature dependence of solubility as will be hereinafter described. Generally, the maximum concentration of P-type promoter which is effective in altering the electrical properties of the base composition is about 2 atomic percent based on total lead, tin, manganese and tellurium. However, for tellurium-excess compositions which contain a high proportion of lead to tin, which compositions preferably include at least 2 or 3 atomic percent manganese, the maximum beneficial effect of sodium, potassium or thallium promoter is obtained at up to about 3 atomic percent. Concentrations in excess of the stated amounts of such additives have no appreciable effect in beneficially altering the electrical properties with which this invention is concerned, and in this sense the limits indicated are to be considered critical.

Sodium, potassium and thallium are effective P-type promoters in both metal-excess or tellurium-excess compositions of the present invention. Antimony and arsenic are P-type promoters under metal-excess conditions but become N-type promoters under tellurium-excess conditions. If selenium or sulfur is present, even in trace amounts, antimony and arsenic become N-type promoters in both tellurium-excess and metal-excess compositions. As tin telluride is substituted for lead telluride, nickel becomes an effective P-type promoter, although its effectiveness is decreased as the metal excess is increased. The optimum efficacy of the nickel is observed over the range where lead telluride and tin telluride are present in nearly equal molecular proportions.

What is claimed is:

1. A P-type thermoelectric composition possessing desirable thermoelectric and physical properties and essentially consisting of tellurium, manganese and at least one of lead and tin wherein up to 50 atomic percent of the tellurium may be substituted by at least one of selenium and sulfur but by at most 20 atomic percent sulfur and wherein the manganese comprises from about 0.7 to 7 atomic percent and the tellurium and tellurium-substitute comprise from about 47.5 to 56.3 atomic percent of the total lead, tin, manganese, tellurium and tellurium-substitute.

2. The thermoelectric composition defined in claim 1 wherein the composition includes at least one promoter selected from the group consisting of sodium, potassium, thallium, antimony, arsenic and nickel in an amount up to 3 atomic percent based on 100 atomic percent total lead, tin, manganese, tellurium and tellurium-substitute.

3. The thermoelectric composition defined in claim 1 wherein the thermoelectric composition is metal-excess and the atomic ratio of lead to tin is at most about 2:1.

4. The thermoelectric composition defined in claim 1 wherein the thermoelectric composition is tellurium-excess and the atomic ratio of tin to lead is at most about 3:1.

5. A metal-excess P-type thermoelectric composition possessing desirable thermoelectric and physical properties and essentially consisting of tin, lead, manganese and tellurium wherein the manganese comprises from about 0.7 to 7 atomic percent and the tellurium comprises at least 49.5 atomic percent of the total tin, lead, manganese and tellurium and the atomic ratio of tin to lead extends from approximately 4:5 to 5:1.

6. The thermoelectric composition defined in claim 5 wherein the atomic ratio of tin to lead is near 1:1 and the composition includes about 1–2 atomic percent of at least one of sodium, potassium and thallium based on 100 atomic percent total tin, lead, manganese and tellurium.

7. A tellurium-excess P-type thermoelectric composition possessing desirable thermoelectric and physical properties and essentially consisting of tellurium, manganese and lead which may include tin in an amount up to an atomic ratio of tin to lead of 1:2, said composition comprising from about 0.7 to 7 atomic percent manganese and at most 50.5 atomic percent tellurium based on total lead, tin, manganese and tellurium.

8. The thermoelectric composition defined in claim 7 wherein the proportion of tin approaches insignificance and the composition includes at least one of sodium, potassium and thallium in an amount up to about 3 atomic percent based on 100 atomic percent of total lead, tin, manganese and tellurium.

9. The thermoelectric composition defined in claim 5 wherein the ingredients are present in approximately the following amounts:

| | Atomic percent |
|---|---|
| Tellurium | 49.9 |
| Tin | 27.7 |
| Lead | 20.3 |
| Manganese | 2.1 |

and the composition also contains about one atomic percent of sodium.

References Cited

UNITED STATES PATENTS

| | | | |
|---|---|---|---|
| 2,811,569 | 10/1957 | Fredrick et al. | 136—238 |
| 2,811,571 | 10/1957 | Fritts et al. | 136—238 |
| 3,005,861 | 10/1961 | Tiller et al. | 136—237 |
| 3,045,057 | 7/1962 | Cornish | 252—62.3 |
| 3,075,031 | 1/1963 | Hockings et al. | 136—238 |

OTHER REFERENCES

Efimova et al.: Soviet Physics-Solid State, volume 1, March 1960, pp. 1217–23. Copy in Scientific Library.

Koval'chik et al.: Soviet Physics-Technical Physics, volume 1, No. 11, 1957, pp. 2337–49. Copy in Group 110.

Nishiyama et al.: Memoirs of the Faculty of Science, Kyushu University, Ser. B, volume 3, 1960, pp. 3–7. Copy in Group 110.

Okada. In, International Conference on Semiconductors, 1958, Proceedings, Pergamon Press, New York, 1959, p. 428. Copy in Group 110.

Verstrepen, Comptes Rednus Hebdomadaries des Seances, de l'Academie des Sciences, volume 251, 1960, pp. 1273–4. Copy in Group 110.

ALLEN B. CURTIS, *Primary Examiner.*

A. M. BEKELMAN, *Assistant Examiner.*